United States Patent
Elhamid et al.

(10) Patent No.: US 6,740,440 B2
(45) Date of Patent: May 25, 2004

(54) INEXPENSIVE DIELECTRIC COOLANT FOR FUEL CELL STACKS

(75) Inventors: Mahmoud H Abd Elhamid, Warren, MI (US); Youssef Morcos Mikhail, Sterling Heights, MI (US); Richard H. Blunk, Macomb Township, Macomb County, MI (US); Daniel John Lisi, Eastpointe, MI (US)

(73) Assignee: General Motors Corporation, Detroit, MI (US)

( * ) Notice: Subject to any disclaimer, the term of this patent is extended or adjusted under 35 U.S.C. 154(b) by 53 days.

(21) Appl. No.: 10/252,736

(22) Filed: Sep. 23, 2002

(65) Prior Publication Data

US 2004/0058210 A1 Mar. 25, 2004

(51) Int. Cl.$^7$ ................................................ H01M 8/04
(52) U.S. Cl. .............................. 429/26; 429/13; 429/38
(58) Field of Search .............................. 429/26, 34, 38, 429/39, 12, 13

(56) References Cited

U.S. PATENT DOCUMENTS

| | | |
|---|---|---|
| 3,964,929 A | 6/1976 | Grevstad |
| 3,964,930 A | 6/1976 | Reiser |
| 3,969,145 A | 7/1976 | Grevstad et al. |
| 4,169,917 A | 10/1979 | Baker et al. .................. 429/26 |
| 4,192,906 A | 3/1980 | Maru ........................... 429/13 |
| 4,574,112 A | 3/1986 | Breault et al. ................ 429/26 |
| 4,583,583 A | 4/1986 | Wittel .......................... 165/46 |
| 4,945,010 A | 7/1990 | Kaufman et al. ............. 429/26 |
| 5,776,624 A | 7/1998 | Neutzler ....................... 429/26 |
| 5,798,186 A | 8/1998 | Fletcher et al. .............. 429/13 |
| 6,195,999 B1 | 3/2001 | Arnold et al. ................ 60/649 |
| 6,202,710 B1 | 3/2001 | Dill et al. ...................... 141/94 |
| 6,316,137 B1 | 11/2001 | Kralick ......................... 429/34 |
| 6,360,835 B1 | 3/2002 | Skala ......................... 180/65.2 |
| 6,365,289 B1 | 4/2002 | Lee et al. ..................... 429/13 |
| 6,394,207 B1 | 5/2002 | Skala ......................... 180/65.2 |

Primary Examiner—Stephen Kalafut
(74) Attorney, Agent, or Firm—Cary W. Brooks

(57) ABSTRACT

An inexpensive dielectric coolant for fuel cell stacks. The present invention is directed to a fuel cell, a fuel cell system, and methods for cooling a fuel cell and fuel cell system. The fuel cell is configured to react fuel with oxygen to generate an electric current and at least one reaction product and comprises an anode, an anode flowpath, a cathode, a cathode flowpath, and a membrane disposed between the anode and the cathode. At least one coolant flowpath is fluidly decoupled from the anode and cathode flowpaths and d fines a coolant isolation manifold. The coolant isolation manifold includes a fluid dielectric coolant that comprises a kerosenic hydrocarbon, which can be kerosene or an emulsion of water in kerosene. It is emphasized that this abstract is provided to comply with the rules requiring an abstract, which will allow a searcher or other reader to quickly ascertain the subject matter of the technical disclosure. It is submitted with the understanding that it will not be used to interpret or limit the scope or meaning of the claims. 37 C.F.R. §1.72(b).

56 Claims, 1 Drawing Sheet

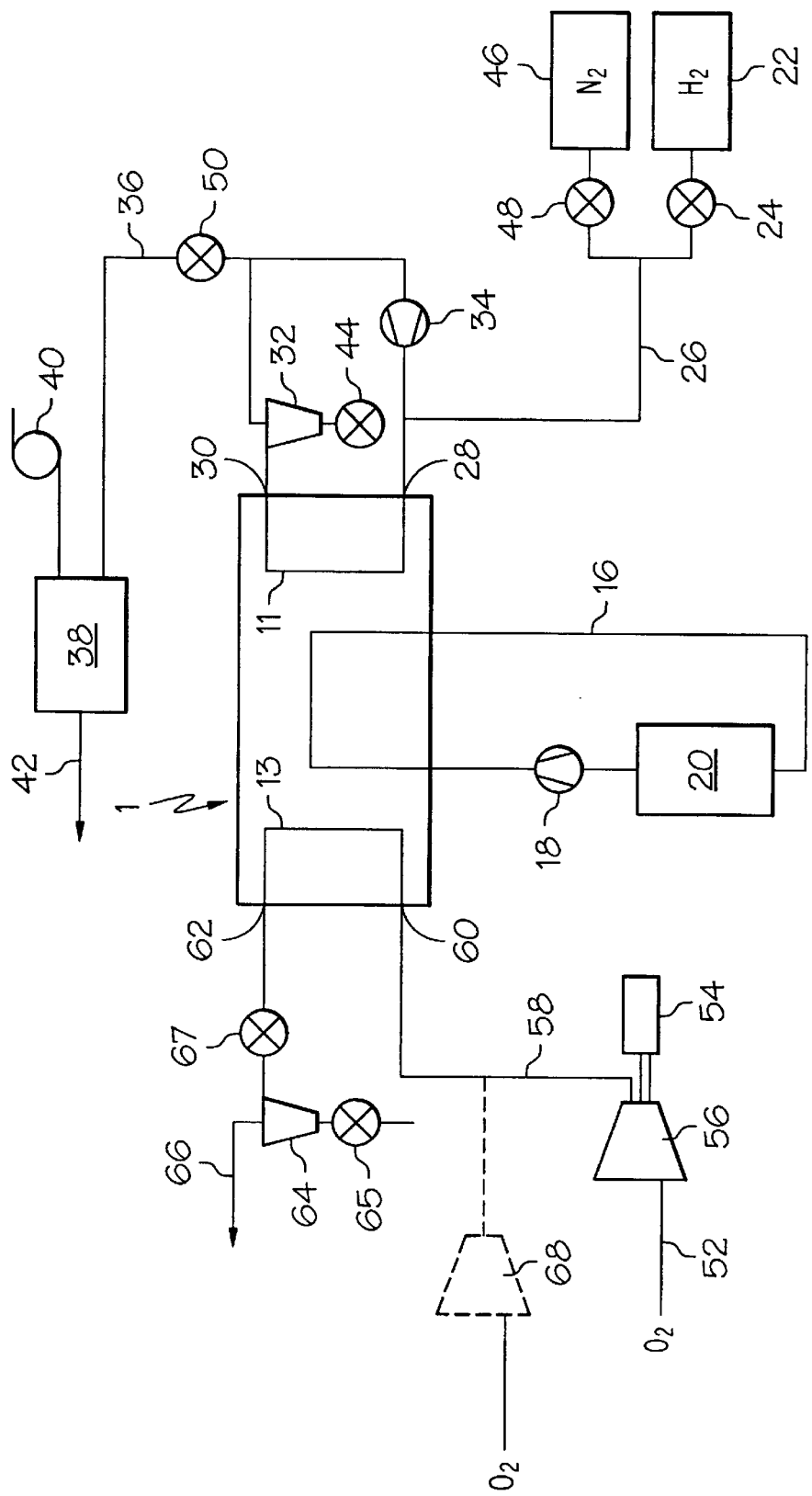

INEXPENSIVE DIELECTRIC COOLANT FOR FUEL CELL STACKS

BACKGROUND OF THE INVENTION

The present invention relates generally to liquid cooled fuel cells and, more particularly, to a fuel cell, a fuel cell system, and methods for cooling a fuel cell or fuel cell system.

SUMMARY OF THE INVENTION

Fuel cells rely on hydrogen oxidation and oxygen reduction to produce electrical energy. The byproduct of these catalytic reactions is water. Thermodynamically, the oxidation of hydrogen fuel at an anode and the reduction of oxygen at a cathode, both the anode and the cathode located within a fuel cell, should give a cell potential of about 1.23 V. However, the actual measured value is typically around 1 V. This difference in cell voltage is due primarily to the slow kinetics of the cathode, which amounts to an almost 200 mV loss in cell voltage. The result of this loss in cell voltage is an expression of excess heat within the fuel cell. The removal of such excess heat is essential to increasing the useful lifetime of the fuel cell components.

As multiple fuel cells are arranged in a stack to increase electrical output, heat generation becomes significantly high. Consequently, in order to remove such excess heat, a coolant is employed that has a high heat capacity and which is physically stable at a temperature between about −40° C. and about 140° C. Aqueous coolants used with conventional combustion engine vehicles fall within this range and typically comprise a mixture of ethylene glycol and water. However, the design of today's fuel cell stacks requires that the coolant be non-conducting (dielectric). If the coolant has a significant conductivity, it will lead to a variety of conductive coolant-induced stack problems including shunt currents that reduce fuel efficiency, gas evolution ($O_2$ and $H_2$) in the header area creating increased pressure within the fuel cell stack requiring venting, coolant degradation, and oxygen degradation of stack components including coating blistering and corrosion acceleration.

Known in the art is the use of ion exchange resins with deionized water to rid of impurities in the coolant and maintain its low conductivity. However, the use of deionized water is limited in areas that experience severe winter weather where temperatures can reach −40° C. At this temperature, water freezes and would not be a suitable coolant or the stack.

Also known is the use of a pure dielectric coolant (i.e., Therminol®-D available from Solutia Inc., St. Louis, Mo.). As a pure dielectric, the fluid does not allow current to flow through the header area of the stack. However, the cost as well as the incompatibility of the coolant with gaskets currently employed in fuel cell stacks makes the use of such pure dielectric coolants impractical.

Accordingly, the present inventors have recognized a need for improvements in liquid coolant technology for fuel cell stacks.

The present invention meets the above-mentioned need by providing an inexpensive and readily available dielectric coolant for fuel cell stacks. Although the present invention is not limited to specific advantages or functionality, it is noted that because the coolant is a dielectric and does not allow for any ionic transport, it does not affect the stack components, and does not allow for any performance loss caused by shunt currents on the header area of the stack. Consequently, corrosion inhibitors need not be added to prohibit $O_2$ degradation of fuel cell components. Although the heat capacity of the dielectric coolant of the present invention is slightly less than aqueous-based coolants, the present coolant has a low kinematic viscosity which enables it to be pumped at higher flow rates to remove waste heat without an appreciable increase in parasitic pumping power. Moreover, the relatively high boiling point of the dielectric coolant enables operating the fuel cell stack and coolant loop at higher temperatures (~140° C.), increasing the capacity to exhaust heat from the radiator to the environment.

In one embodiment, the present invention provides a fuel cell configured to react fuel with oxygen to generate an electric current and at least one reaction product. The fuel cell comprises an anode flowpath, an anode, a cathode flowpath, a cathode, a membrane disposed between the anode and the cathode, and at least one coolant flowpath. The al ode flowpath is configured to route the fuel through at least a portion of the fuel cell. The anode is in fluid communication with the anode flowpath and upon which a catalytic reaction with the fuel is configured to take place. The cathode flowpath is configured to route the oxygen through at least a portion of the fuel cell. The cathode is in fluid communication with the cathode flowpath and upon which a catalytic reaction with the oxygen is configured to take place. The membrane is disposed between the anode and the cathode such that electrolyte communication is established therebetween during operation of the fuel cell. The coolant flowpath is fluidly decoupled from the anode flowpath and the cathode flowpath. The coolant flowpath defines a coolant isolation manifold that includes a fluid dielectric coolant, which comprises a kerosenic hydrocarbon.

In another embodiment, the present invention provides a fuel cell configured to react fuel with oxygen to generate an electric current and at least one reaction product. The fuel cell comprises an anode flowpath, an anode, a cathode flowpath, a cathode, a membrane disposed between the anode and the cathode, at least one coolant flowpath, and a recirculation assembly. The anode flowpath is configured to route the fuel through at least a portion of the fuel cell. The anode is in fluid communication with the anode flowpath and upon which a catalytic reaction with the fuel is configured to take place. The cathode flowpath is configured to route the oxygen through at least a portion of the fuel cell. The cathode is in fluid communication with the cathode flowpath and upon which a catalytic reaction with the oxygen is configured to take place. The membrane is disposed between the anode and the cathode such that electrolyte communication is established therebetween during operation of the fuel cell. The coolant flowpath is fluidly decoupled from the anode flowpath and the cathode flowpath. The coolant flowpath defines a coolant isolation manifold that includes an inlet, an outlet, and a fluid dielectric coolant, which comprises a kerosenic hydrocarbon. The recirculation assembly comprises a recirculation flowpath, a pump, and a radiator. The recirculation flowpath fluidly connects the coolant isolation manifold inlet and the coolant isolation manifold outlet.

In still another embodiment, the present invention provides a fuel cell system comprising a fuel cell stack comprising a plurality of fuel cells, wherein each fuel cell is configured to react fuel with oxygen to generate an electric current and at least one reaction product. Each fuel cell comprises an anode flowpath, an anode, a cathode flowpath, a cathode, a membrane disposed between the anode and the cathode, and at least one coolant flowpath. The anode flowpath is configured to route the fuel through at least a portion of each fuel cell. The anode is in fluid communication with the anode flowpath and upon which a catalytic reaction with the fuel is configured to take place. The cathode flowpath is configured to route the oxygen through at least a portion of each fuel cell. The cathode is in fluid communication with the cathode flowpath and upon which a catalytic reaction with the oxygen is configured to take place. The membrane is disposed between the anode and the cathode such that electrolyte communication is established therebetween during operation of each fuel cell. The coolant flowpath is fluidly decoupled from the anode flowpath and the cathode flowpath. The coolant flowpath defines a coolant isolation manifold that includes a fluid dielectric coolant, which comprises a kerosenic hydrocarbon.

In yet another embodiment, the present invention provides a fuel cell system comprising a fuel cell stack comprising a plurality of fuel cells, wherein each fuel cell is configured to react fuel with oxygen to generate an electric current and at least one reaction product. The fuel cell comprises an anode flowpath, an anode, a cathode flowpath, a cathode, a membrane disposed between the anode and the cathode, at least one coolant flowpath, and a recirculation assembly. The anode flowpath is configured to route the fuel through at least a portion of each fuel cell. The anode is in fluid communication with the anode flowpath and upon which a catalytic reaction with the fuel is configured to take place. The cathode flowpath is configured to route the oxygen through at least a portion of each fuel cell. The cathode is in fluid communication with the cathode flowpath and upon which a catalytic reaction with the oxygen is configured to take place. The membrane is disposed between the anode and the cathode such that electrolyte communication is established therebetween during operation of each fuel cell. The coolant flowpath is fluidly decoupled from the anode flowpath and the cathode flowpath. The coolant flowpath defines a coolant isolation manifold that includes an inlet, an outlet, and a fluid dielectric coolant, which comprises a kerosenic hydrocarbon. The recirculation assembly comprises a recirculation flowpath, a pump, and a radiator. The recirculation flowpath fluidly connects the coolant isolation manifold inlet and the coolant isolation manifold outlet.

In still yet another embodiment, the present invention provides a method for cooling a fuel cell comprising providing a fuel cell configured to react fuel with oxygen to generate an electric current and at least one reaction product. The method further comprises configuring the fuel cell to include an anode, a cathode, and a membrane disposed between the anode and the cathode; configuring an anode flowpath and a cathode flowpath to route the fuel and oxygen to the anode and the cathode, respectively; and, configuring at least one coolant flowpath to be fluidly decoupled from the anode flowpath and the cathode flowpath. The coolant flowpath defines a coolant isolation manifold, and the coolant isolation manifold includes a fluid dielectric coolant, which comprises a kerosenic hydrocarbon.

In still yet another embodiment, the present invention provides a method for cooling a fuel cell comprising providing a fuel cell configured to react fuel with oxygen to generate an electric current and at least one reaction product. The method further comprises configuring the fuel cell to include an anode, a cathode, and a membrane disposed between the anode and the cathode; configuring an anode flowpath and a cathode flowpath to route the fuel and oxygen to the anode and the cathode, respectively; and, configuring at least one coolant flowpath to be fluidly decoupled from the anode flowpath and the cathode flowpath. The coolant flowpath defines a coolant isolation manifold, and the coolant isolation manifold includes an inlet, and outlet, and a fluid dielectric coolant, which comprises a kerosenic hydrocarbon. In addition, the method comprises configuring a recirculation assembly comprising a recirculation flowpath so that the recirculation flowpath fluidly connects the coolant isolation manifold inlet and the coolant isolation manifold outlet, which recirculation assembly further includes a pump and a radiator, circulating the fluid dielectric coolant throughout the coolant isolation manifold, whereby the fluid dielectric coolant draws heat from the fuel cell to produce a heated fluid dielectric coolant, and circulating the heated fluid dielectric coolant from the coolant isolation manifold outlet to the radiator via the recirculation flowpath, whereby the heated fluid dielectric coolant is cooled and returned to the coolant isolation manifold inlet.

In still yet another embodiment, the present invention provides a method for cooling a fuel cell system comprising providing a fuel cell stack comprising a plurality of fuel cells, wherein each fuel cell is configured to react fuel with oxygen to generate an electric current and at least one reaction product. The method further comprises configuring each fuel cell to include an anode, a cathode, and a membrane disposed between the anode and the cathode; configuring an anode flowpath and a cathode flowpath to route the fuel and oxygen to the anode and the cathode, respectively; and, configuring at least one coolant flowpath to be fluidly decoupled from the anode flowpath and the cathode flowpath. The coolant flowpath defines a coolant isolation manifold, and the coolant isolation manifold includes a fluid dielectric coolant, which comprises a kerosenic hydrocarbon.

In still yet another embodiment, the present invention provides a method for cooling a fuel cell system comprising providing a fuel cell stack comprising a plurality of fuel cells, wherein each fuel cell is configured to react fuel with oxygen to generate an electric current and at least one reaction product. The method further comprises configuring each fuel cell to include an anode, a cathode, and a membrane disposed between the anode and the cathode; configuring an anode flowpath and a cathode flowpath to route the fuel and oxygen to the anode and the cathode, respectively; and, configuring at least one coolant flowpath to be fluidly decoupled from the anode flowpath and the cathode flowpath. The coolant flowpath defines a coolant isolation manifold, and the coolant isolation manifold includes an inlet, and outlet, and a fluid dielectric coolant, which comprises a kerosenic hydrocarbon. In addition, the method comprises configuring a recirculation assembly comprising a recirculation flowpath so that the recirculation flowpath fluidly connects the coolant isolation manifold inlet and the coolant isolation manifold outlet, which recirculation assembly further includes a pump and a radiator, circulating the fluid dielectric coolant throughout the coolant isolation manifold, whereby the fluid dielectric coolant draws heat from the fuel cell to produce a heated fluid dielectric coolant, and circulating the heated fluid dielectric coolant from the coolant isolation manifold outlet to the radiator via the recirculation flowpath, whereby the heated fluid dielectric coolant is cooled and returned to the coolant isolation manifold inlet.

These and other features and advantages of the invention will be more fully understood from the following detailed description of the invention taken together with the accompanying drawings. It is noted that the scope of the claims is defined by the recitations therein and not by the specific discussion of features and advantages set forth in the present description.

BRIEF DESCRIPTION OF THE DRAWINGS

The following detailed description of the embodiments of the present invention can be best understood when read in conjunction with the following drawing, where like structure is indicated with like reference numerals and in which:

FIG. 1 is a schematic illustration of a fuel cell system in accordance with the present invention.

Skilled artisans appreciate that elements in the figure are illustrated for simplicity and clarity and have not necessarily been drawn to scale. For example, the dimensions of some of the elements in the figure may be exaggerated relative to other elements to help to improve understanding of the embodiments of the present invention.

DETAILED DESCRIPTION OF SOME EMBODIMENTS OF THE INVENTION

In accordance with one embodiment of the present invention, a fuel cell is provided that is configured to react fuel (typically, gaseous hydrogen) with oxygen to generate an electric current and at least one reaction product. Among the other components of the fuel cell that will be described in further detail below, the fuel cell comprises at least one coolant flowpath that defines a coolant isolation manifold. The manifold includes a fluid dielectric coolant, which is employed to cool the fuel cell and increase the useful life of its components.

In this first embodiment of the instant invention, the fluid dielectric coolant comprises a kerosenic hydrocarbon. By "kerosenic hydrocarbon" we mean any refined petroleum fraction comprising at least some paraffinic and/or naphthenic hydrocarbons in the $C_{10}$ to $C_{16}$ range. The kerosenic hydrocarbon can be kerosene. Although other nondielectric, aqueous-based coolants have a higher heat capacity than the kerosenic hydrocarbon, the low kinematic viscosity of the kerosenic hydrocarbon enables it to be pumped at higher flow rates. The heat capacity of the kerosenic hydrocarbon can be up to and including about 2.5 J/g/K (compared to 4.2 J/g/K for water) and it has a viscosity of less than or about 10 cP at about 80° C., or less than or about 40 cP at about 0° C. This facilitates the removal of waste heat from the fuel cell without an appreciable increase in parasitic pumping power. The pumping power required to circulate the fluid dielectric coolant can be reduced by using bipolar plates possessing additional open coolant flowpaths.

Unlike aqueous-based coolants that can freeze in cold environments, the freezing point of the kerosenic hydrocarbon coolant of the present invention is less than or about −35° C. More particularly, the freezing point of the kerosenic hydrocarbon can be between about −40 and about 0° C. Consequently, the kerosenic hydrocarbon can be employed in cold environments without a risk of coolant failure due to freezing.

On the other end of the temperature spectrum, the boiling point of the kerosenic hydrocarbon coolant of the present invention is greater than or about 85° C. More particularly, the boiling point of the kerosenic hydrocarbon can be between about 175° C. and about 325° C. In addition, the kerosenic hydrocarbon has a flash point between about 37.7° C. and about 65.5° C., and can auto ignite at about 444° F. (228° C.). The thermal conductivity of the kerosenic hydrocarbon coolant can be up to and including about 0.15 W/m-K or, more particularly, between about 0.05 and about 0.4 W/m-K. The electrical resistivity of the kerosenic hydrocarbon coolant of the present invention is greater than or about 18 Mohm cm. More particularly, the electrical resistivity of the kerosenic hydrocarbon coolant can be between about 0.25 and about 40 Mohm cm.

The use of the kerosene hydrocarbon as a coolant can extend the useful life of the fuel cell, as unlike aqueous-based coolants, kerosenic hydrocarbons such as kerosene will not degrade the stack components. Consequently, corrosion inhibitors need not be added to the fluid dielectric coolant of the instant invention.

In accordance with another embodiment of the invention, the fluid dielectric coolant can comprise an emulsion of water in kerosene. Deionized water can be used in formulating the emulsion at between about 0 and about 30%. The emulsion takes advantage of the increased heat capacity of water (4.2 J/g/K) to raise the heat capacity of the kerosenic hydrocarbon coolant. Accordingly, the heat capacity of the fluid dielectric coolant of the instant embodiment of the invention comprising the water in kerosene emulsion is about 2.3 J/g/K. This increase is heat capacity is obtained while still maintaining the nonconductive character and low viscosity of the pure kerosene coolant of the first embodiment of the invention. One typical example of a water in kerosene emulsion is PuriNOx™, a pollution-reducing diesel fuel available from The Lubrizol Corporation (Wickliffe, Ohio).

In accordance with still another embodiment of the present invention, a fuel cell system is provided comprising a plurality of fuel cells combined to form a fuel cell stack. Each fuel cell within the stack is configured to react fuel with oxygen to generate an electric current and at least one reaction product. Included in the stack is at least one coolant flowpath, which defines a coolant isolation manifold. The manifold includes a fluid dielectric coolant that can be a kerosenic hydrocarbon (i.e., kerosene), or an emulsion of water in kerosene.

The conductivity of the fluid dielectric coolant is considerably important when choosing a coolant for fuel cell stacks. This is primarily because of the stack design that employs a header area to distribute the reactive gasses as well as the coolant to the coolant flowpath. In this header area, an electric field of 10 V/cm is easily attained. Ionic contamination of aqueous coolants can increase the conductivity to unacceptable levels causing shunt currents in the header area.

However, the kerosene and kerosene in water emulsion coolants of the present invention are dielectrics that do not permit ionic transport. Consequently, even when contaminated, the kerosenic hydrocarbon, fluid dielectric coolants do not affect the stack components and also do not allow for performance loss due to shunt current on the header area of the stack. And unlike the ion exchange resins that thermally degrade prematurely at temperatures exceeding 90° C., the present dielectric coolant can operate without an ion exchanger at much greater temperatures in order to efficiently exhaust waste heat at the radiator.

In accordance with yet another embodiment of the present invention, a fuel cell and fuel cell system are provided, each comprising at least one coolant flowpath and a recirculation assembly comprising a recirculation flowpath, a pump, and a radiator. The coolant flowpath defines a coolant isolation manifold that includes an inlet, an outlet, and a fluid dielectric coolant that can comprise a kerosenic hydrocarbon such as kerosene, or an emulsion of water in kerosene. The recirculation flowpath extends from the coolant isolation manifold inlet and fluidly connects the pump and radiator to the coolant isolation manifold outlet. The recirculation assembly is configured to circulate coolant throughout the coolant flowpath, thus drawing waste heat from the fuel cell or fuel cell stack and delivering it via the recirculation flowpath to the radiator. The radiator can be any radiator that is effective in removing heat from the heated dielectric coolant for recirculation back to the coolant isolation manifold.

The fuel cell and fuel cell system of the present invention each further comprise an anode flowpath configured to route fuel through at least a portion of each fuel cell. The anode is in fluid communication with the anode flowpath, upon which a catalytic reaction with the, fuel is configured to take place. In addition, each fuel cell comprises a cathode flowpath configured to route oxygen through at least a portion of each fuel cell. The cathode is in fluid communication with the cathode flowpath and a catalytic reaction is configured to take place on the cathode. Moreover, a membrane is disposed between the anode and the cathode such that electrolyte communication is established therebetween during operation of the fuel cell or fuel cell system.

Referring now to FIG. 1, a schematic illustration of a typical fuel cell or fuel cell system for use in accordance with the present invention is provided. Fuel cell stack 1 includes a plurality of individual fuel cells that can be electrically connected in series, in parallel, or a combination of both. At the anode side 11 of the fuel cell stack 1, fuel (typically, gaseous hydrogen $H_2$) can be fed from a supply 22 via a valve 24 and line 26 into the anode via the anode flowpath, which is positioned within the fuel cell. The fuel therefore enters the fuel cell stack 1 at the inlet 28, while anode exhaust gasses containing unconsumed hydrogen and water exit the fuel cell stack 1 at the outlet 30. The water that condenses out can be received in a collection receptacle 32, while a portion of the exiting hydrogen can be returned to the inlet 28 by means of a pump 34. The remaining anode side exhaust gasses can be fed via a valve 50 and line 36 to a combustor device 38, where together with air from a fan 40, the anode side exhaust gasses are burned such that the combustion of exhaust gasses, primarily nitrogen and water vapor, leave the fuel cell stack 1 via line 42. The water that has collected in the receptacle 32 can be drained periodically by means of a drain valve 44.

At the anode side 11 of the fuel cell stack 1 there can also be a supply of nitrogen $N_2$ in a reservoir 46. When the fuel cell stack 1 is off, valve 24 can be closed and valve 48 can be opened in order to introduce nitrogen $N_2$ via line 26 into the anode flowpath in the fuel cell in order to displace the hydrogen $H_2$ from the fuel cell. The hydrogen $H_2$ can then be burned under controlled conditions in the combustor 38, thereby reducing the danger of hydrogen $H_2$ accumulation in the fuel cell. The combustion device 38 need not be continuously in operation and can be isolated from the anode side 11 circuit by means of the valve 50.

Oxygen $O_2$ enters the cathode side 13 of the fuel cell stack 1 via line 52, and can be compressed by a compressor 56 that is driven by a motor 54. After passing through compressor 56, the oxygen $O_2$ passes through line 58 to the cathode inlet 60, where it enters the cathode within the fuel cell via the cathode flowpath. The cathode exhaust gas, which primarily consists of water vapor, nitrogen and oxygen, exits from the cathode outlet 62 of the fuel cell stack 1, where water vapor can be collected in a receptacle 64, while the remaining exhaust gasses are vented to the atmosphere via line 66 and valve 67. An optional auxiliary compressor 68, which is also driven by a motor (not shown), or compressor 56 can be used to start up the fuel cell system. As with the anode side 11 of the fuel cell system, a valve 65 can be used to selectively allow water collected in receptacle 64 to be drained from the system.

In accordance with the present invention, the recirculation assembly 16 is represented as a loop to ensure adequate cooling of the fuel cell stack 1 during system operation. The assembly 16 is autonomous relative to the anode side 11 and the cathode side 13 such that the dielectric coolant (a kerosenic hydrocarbon such as kerosene, or a water in kerosene emulsion) in the assembly 16 does not mix with the fluid generated by the reaction between the hydrogen $H_2$ and oxygen $O_2$ at the cathode. The assembly 16 further includes a closed recirculation flowpath with a pump 18 and a radiator 20.

In accordance with yet still another embodiment of the present invention, a method for cooling a fuel cell or fuel cell system is provided comprising providing a fuel cell or fuel cell stack that is configured as hereinbefore described and circulating the fluid dielectric coolant throughout the coolant isolation manifold, such that the fluid dielectric coolant draws heat from the fuel cell, producing a heated dielectric coolant. The fluid dielectric coolant can comprise a kerosenic hydrocarbon such as kerosene, or an emulsion of water in kerosene, as described in further detail above. The method further comprises circulating the heated fluid dielectric coolant from the coolant isolation manifold to the radiator via the recirculation flowpath, cooling the heated fluid dielectric coolant in the radiator, and returning the cooled fluid dielectric coolant to the manifold inlet.

While the invention has been described by reference to certain embodiments, is should be understood that numerous changes could be made within the spirit and scope of the inventive concepts described. Accordingly, it is intended that the invention not be limited to the disclosed embodiments, but that is have the full scope permitted by the language of the following claims.

What is claimed is:

1. A fuel cell configured to react fuel with oxygen to generate an electric current and at least one reaction product, said fuel cell comprising:

an anode flowpath configured to route said fuel through at least a portion of said fuel cell;

an anode,in fluid communication with said anode flowpath and upon which a catalytic reaction with said fuel is configured to take place;

a cathode flowpath configured to route said oxygen through at least a portion of said fuel cell;

a cathode in fluid communication with said cathode flowpath and upon which a catalytic reaction with said oxygen is configured to take place;

a membrane disposed between said anode and said cathode such that electrolyte communication is established therebetween during operation of said fuel cell; and at least one coolant flowpath fluidly decoupled from said anode flowpath and said cathode flowpath, wherein said coolant flowpath defines a coolant isolation manifold, and wherein said coolant isolation manifold includes a fluid dielectric coolant, said fluid dielectric coolant comprising a kerosenic hydrocarbon.

2. The fuel cell of claim 1 wherein said kerosenic hydrocarbon comprises kerosene.

3. The fuel cell of claim 1 wherein said kerosenic hydrocarbon comprises a heat capacity of up to and including about 2.5 J/g/K.

4. The fuel cell of claim 1 wherein said kerosenic hydrocarbon comprises a viscosity of less than or about 10 cP at about 80° C.

5. The fuel cell of claim 1 wherein said kerosenic hydrocarbon comprises a viscosity of less than or about 40 cP at about 0° C.

6. The fuel cell of claim 1 wherein said kerosenic hydrocarbon comprises a freezing point of less than or about −35° C.

7. The fuel cell of claim 1 wherein said kerosenic hydrocarbon comprises a freezing point of between about −40 and about 0° C.

8. The fuel cell of claim 1 wherein said kerosenic hydrocarbon comprises a boiling point of greater than or about 85° C.

9. The fuel cell of claim 1 wherein said kerosenic hydrocarbon comprises a boiling point of between about 175 and about 325° C.

10. The fuel cell of claim 1 wherein said kerosenic hydrocarbon comprises a flash point between about 37.7° C. and about 65.5° C.

11. The fuel cell of claim 1 wherein said kerosenic hydrocarbon auto ignites at about 228° C.

12. The fuel cell of claim 1 wherein said kerosenic hydrocarbon comprises a thermal conductivity of up to and including about 0.15 W/m-K.

13. The fuel cell of claim 1 wherein said kerosenic hydrocarbon comprises a thermal conductivity of between about 0.05 and about 0.4 W/m-K.

14. The fuel cell of claim 1 wherein said kerosenic hydrocarbon comprises an electrical resistivity of greater than or about 18 Mohm cm.

15. The fuel cell of claim 1 wherein said kerosenic hydrocarbon comprises an electrical resistivity of between about 0.25 and about 40 Mohm cm.

16. The fuel cell of claim 1 wherein said fluid dielectric coolant comprises an emulsion of water in kerosene.

17. The fuel cell of claim 16 wherein said emulsion comprises a heat capacity of up to and including about 2.3 J/g/K.

18. The fuel cell of claim 16 wherein said emulsion comprises between about 0 and about 30% water.

19. The fuel tell of claim 16 wherein said water comprises deionized water.

20. A fuel cell configured to react fuel with oxygen to generate an electric current and at least one reaction product, said fuel cell comprising:
  an anode flowpath configured to route said fuel through at least a portion of said fuel cell;
  an anode in fluid communication with said anode flowpath and upon which a catalytic reaction with said fuel is configured to take place;
  a cathode flowpath configured to route said oxygen through at least a portion of said fuel cell;
  a cathode in fluid communication with said cathode flowpath and upon which a catalytic reaction with said oxygen is configured to take place;
  a membrane disposed between said anode and said cathode such that electrolyte communication is established therebetween during operation of said fuel cell;
  at least on e coolant flowpath fluidly decoupled from said anode flowpath and said cathode flowpath, wherein said coolant flowpath defines a coolant isolation manifold, and wherein said coolant isolation manifold includes an inlet, an outlet, and a fluid dielectric coolant, said fluid dielectric coolant comprising a kerosenic hydrocarbon; and
  a recirculation assembly comprising a recirculation flowpath, a pump, and a radiator, wherein said recirculation flowpath fluidly connects said coolant isolation manifold inlet and said coolant isolation manifold outlet.

21. The fuel cell of claim 20 wherein said kerosenic hydrocarbon comprises kerosene.

22. The fuel cell of claim 20 wherein said fluid dielectric coolant comprises an emulsion of water in kerosene.

23. A fuel cell system comprising:
  a fuel cell stack comprising a plurality of fuel cells, wherein each said fuel cell is configured to react fuel with oxygen to generate an electric current and at least one reaction product, each said fuel cell comprising:
  an anode flowpath configured to route said fuel through at least a portion of each said fuel cell;
  an anode in fluid communication with said anode flowpath and upon which a catalytic reaction with said fuel is configured to take place;
  a cathode flowpath configured to route said oxygen through at least a portion of each said fuel cell;
  a cathode in fluid communication with said cathode flowpath and upon which a catalytic reaction with said oxygen is configured to take place;
  a membrane disposed between said anode and said cathode such that electrolyte communication is established therebetween during operation of each said fuel cell; and
  at least one coolant flowpath fluidly decoupled from said anode flowpath and said cathode flowpath, wherein said coolant flowpath defines a coolant isolation manifold, and wherein said coolant isolation manifold includes a fluid dielectric coolant, said fluid dielectric coolant comprising a kerosenic hydrocarbon.

24. The fuel cell system of claim 23 wherein said kerosenic hydrocarbon comprises kerosene.

25. The fuel cell system of claim 23 wherein said fluid dielectric coolant comprises an emulsion of water in kerosene.

26. A fuel cell system comprising:
  a fuel cell stack comprising a plurality of fuel cells, wherein each said fuel cell is configured to react fuel with oxygen to generate an electric current and at least one reaction product, each said fuel cell comprising:
  an anode flowpath configured to route said fuel through at least a portion of each said fuel cell;
  an anode in fluid communication with said anode flowpath and upon which a catalytic reaction with said fuel is configured to take place;
  a cathode flowpath configured to route said oxygen through at least a portion of each said fuel cell;
  a cathode in fluid communication with said cathode flowpath and upon which a catalytic reaction with said oxygen is configured to take place;
  a membrane disposed between said anode and said cathode such that electrolyte communication is established therebetween during operation of each said fuel cell;
  at least one coolant flowpath fluidly decoupled from said anode flowpath and said cathode flowpath, wherein said coolant flowpath defines a coolant isolation manifold, and wherein said coolant isolation manifold includes an inlet, and outlet, and a fluid dielectric coolant, said fluid dielectric coolant comprising a kerosenic hydrocarbon; and
  a recirculation assembly comprising a recirculation flowpath, a pump, and a radiator, wherein said recirculation flowpath fluidly connects said coolant isolation manifold inlet and said coolant isolation manifold outlet.

27. The fuel cell system of claim 26 wherein said kerosenic hydrocarbon comprises kerosene.

28. The fuel cell system of claim 26 wherein said fluid dielectric coolant comprises an emulsion of water in kerosene.

29. A method for cooling a fuel cell comprising:
providing a fuel cell configured to react fuel with oxygen to generate an electric current and at least one reaction product;
configuring said fuel cell to include an anode, a cathode, and a membrane disposed between said anode and said cathode;
configuring an anode flowpath and a cathode flowpath to route said fuel and oxygen to said anode and said cathode, respectively; and
configuring at least one coolant flowpath to be fluidly decoupled from said anode flowpath and said cathode flowpath, wherein said coolant flowpath defines a coolant isolation manifold, and wherein said coolant isolation manifold includes a fluid dielectric coolant, said fluid dielectric coolant comprising a kerosenic hydrocarbon.

30. The method for cooling a fuel cell of claim 29 wherein said kerosenic hydrocarbon comprises kerosene.

31. The method for cooling a fuel cell of claim 29 wherein said kerosenic hydrocarbon comprises a heat capacity of up to and including about 2.5 J/g/K.

32. The method for cooling a fuel cell of claim 29 wherein said kerosenic hydrocarbon comprises a viscosity of less than or about 10 cP at about 80° C.

33. The method for cooling a fuel cell of claim 29 wherein said kerosenic hydrocarbon comprises a viscosity of less than or about 40 cP at about 0° C.

34. The method for cooling a fuel cell of claim 29 wherein said kerosenic hydrocarbon comprises a freezing point of less than or about −35° C.

35. The method for cooling a fuel cell of claim 29 wherein said kerosenic hydrocarbon comprises a freezing point of between about −40 and about 0° C.

36. The method for cooling a fuel cell of claim 29 wherein said kerosenic hydrocarbon comprises a boiling point of greater than or about 85° C.

37. The method for cooling a fuel cell of claim 29 wherein said kerosenic hydrocarbon comprises a boiling point of between about 175 and about 325° C.

38. The method for cooling a fuel cell of claim 29 wherein said kerosenic hydrocarbon comprises a flash point between about 37.7° C. and about 65.5° C.

39. The method for cooling a fuel cell of claim 29 wherein said kerosenic hydrocarbon auto ignites at about 228° C.

40. The method for cooling a fuel cell of claim 29 wherein said kerosenic hydrocarbon comprises a thermal conductivity of up to and including about 0.15 W/m-K.

41. The method for cooling a fuel cell of claim 29 wherein said kerosenic hydrocarbon comprises a thermal conductivity of between about 0.05 and about 0.4 W/m-K.

42. The method for cooling a fuel cell of claim 29 wherein said kerosenic hydrocarbon comprises an electrical resistivity of greater than or about 18 Mohm cm.

43. The method for cooling a fuel cell of claim 29 wherein said kerosenic hydrocarbon comprises an electrical resistivity of between about 0.25 and about 0.4 Mohm cm.

44. The method for cooling a fuel cell of claim 29 wherein said fluid dielectric coolant comprises an emulsion of water in kerosene.

45. The method for cooling a fuel cell of claim 44 wherein said emulsion comprises a heat capacity of up to and including about 2.3 J/g/K.

46. The method for cooling a fuel cell of claim 44 wherein said emulsion comprises between about 0 and about 30% water.

47. The method for cooling a fuel cell of claim 44 wherein said water comprises deionized water.

48. A method for cooling a fuel cell comprising:
providing a fuel cell configured to react fuel with oxygen to generate an electric current and at least one reaction product;
configuring said fuel cell to include an anode, a cathode, and a membrane disposed between said anode and said cathode;
configuring an anode flowpath and a cathode flowpath to route said fuel and oxygen to said anode and said cathode, respectively;
configuring at least one coolant flowpath to be fluidly decoupled from said anode flowpath and said cathode flowpath, wherein said coolant flowpath defines a coolant isolation manifold, and wherein said coolant isolation manifold includes an inlet, an outlet, and a fluid dielectric coolant, said fluid dielectric coolant comprising a kerosenic hydrocarbon;
configuring a recirculation assembly comprising a recirculation flowpath so that said recirculation flowpath fluidly connects said coolant isolation manifold inlet and said coolant isolation manifold outlet, said recirculation assembly further including a pump and a radiator;
circulating said fluid dielectric coolant throughout said coolant isolation manifold, whereby said fluid dielectric coolant draws heat from said fuel cell to produce a heated fluid dielectric coolant; and
circulating said heated fluid dielectric coolant from said coolant isolation manifold outlet to said radiator via said recirculation flowpath, whereby said heated fluid dielectric coolant is cooled and returned to said coolant isolation manifold inlet.

49. The method of claim 48 wherein said kerosenic hydrocarbon comprises kerosene.

50. The method of claim 48 wherein said fluid dielectric coolant comprises an emulsion of water in kerosene.

51. A method for cooling a fuel cell system comprising:
providing a fuel cell stack comprising a plurality of fuel cells, wherein each said fuel cell is configured to react fuel with oxygen to generate an electric current and at least one reaction product;
configuring each said fuel cell to include an anode, a cathode, and a membrane disposed between said anode and said cathode;
configuring an anode flowpath and a cathode flowpath to route said fuel and oxygen to said anode and said cathode, respectively; and
configuring at least one coolant flowpath to be fluidly decoupled from said anode flowpath and said cathode flowpath, wherein said coolant flowpath defines a coolant isolation manifold, and wherein said coolant isolation manifold includes a fluid dielectric coolant, said fluid dielectric coolant comprising a kerosenic hydrocarbon.

52. The method of claim 51 wherein said kerosenic hydrocarbon comprises kerosene.

53. The method of claim 51 wherein said fluid dielectric coolant comprises an emulsion of water in kerosene.

54. A method for cooling a fuel cell system comprising:

providing a fuel cell stack comprising a plurality of fuel cells, wherein each said fuel cell is configured to react fuel with oxygen to generate an electric current and at least one reaction product;

configuring each said fuel cell to include an anode, a cathode, and a membrane disposed between said anode and said cathode;

configuring an anode flowpath and a cathode flowpath to route said fuel and oxygen to said anode and said cathode, respectively;

configuring at least one coolant flowpath to be fluidly decoupled from said anode flowpath and said cathode flowpath, wherein said coolant flowpath defines a coolant isolation manifold, and wherein said coolant isolation manifold includes an inlet, an outlet, and a fluid dielectric coolant, said fluid dielectric coolant comprising a kerosenic hydrocarbon;

configuring a recirculation assembly comprising a recirculation flowpath so that said recirculation flowpath fluidly connects said coolant isolation manifold inlet and said coolant isolation manifold outlet, said recirculation assembly further including a pump and a radiator;

circulating said fluid dielectric coolant throughout said coolant isolation manifold, whereby said fluid dielectric coolant draws heat from said fuel cell to produce a heated fluid dielectric coolant; and circulating said heated fluid dielectric coolant from said coolant isolation manifold outlet to said radiator via said recirculation flowpath, whereby said heated fluid dielectric coolant is cooled and returned to said coolant isolation manifold inlet.

55. The method of claim 54 wherein said kerosenic hydrocarbon comprises kerosene.

56. The method of claim 54 wherein said fluid dielectric coolant comprises an emulsion of water in kerosene.

* * * * *

UNITED STATES PATENT AND TRADEMARK OFFICE
CERTIFICATE OF CORRECTION

PATENT NO. : 6,740,440 B2
DATED : May 25, 2004
INVENTOR(S) : Abd Elhamid et al.

It is certified that error appears in the above-identified patent and that said Letters Patent is hereby corrected as shown below:

<u>Title page,</u>
Item [12], "Elhamid et al." should read -- Abd Elhamid et al. --

Signed and Sealed this

Twenty-seventh Day of July, 2004

JON W. DUDAS
*Acting Director of the United States Patent and Trademark Office*